(12) United States Patent
Tan et al.

(10) Patent No.: US 10,204,054 B2
(45) Date of Patent: Feb. 12, 2019

(54) MEDIA CACHE CLEANING

(71) Applicant: SEAGATE TECHNOLOGY LLC, Cupertino, CA (US)

(72) Inventors: Loo Shing Tan, Singapore (SG); WenXiang Xie, Singapore (SG); Aung Khant, Myanmar (MM); Feng Shen, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 3 days.

(21) Appl. No.: 14/503,635

(22) Filed: Oct. 1, 2014

(65) Prior Publication Data

US 2016/0098352 A1 Apr. 7, 2016

(51) Int. Cl.
*G06F 12/00* (2006.01)
*G06F 12/0875* (2016.01)
*G06F 12/0891* (2016.01)

(52) U.S. Cl.
CPC ........ *G06F 12/0875* (2013.01); *G06F 1/3212* (2013.01); *G06F 1/3228* (2013.01); *G06F 1/3268* (2013.01); *G06F 12/0891* (2013.01); *G06F 2212/455* (2013.01); *Y02D 10/154* (2018.01); *Y02D 10/174* (2018.01)

(58) Field of Classification Search
CPC ............. G06F 12/0875; G06F 12/0891; G06F 1/3228; G06F 1/3212; G06F 1/3268; G06F 2212/455; Y02D 10/174; Y02D 10/154

See application file for complete search history.

(56) References Cited

U.S. PATENT DOCUMENTS

| | | | |
|---|---|---|---|
| 5,455,926 A | 10/1995 | Keele et al. | |
| 6,052,789 A * | 4/2000 | Lin | G06F 1/3203 365/229 |
| 7,711,890 B2 * | 5/2010 | Lasser | 711/103 |
| 7,996,645 B2 | 8/2011 | New et al. | |
| 8,095,851 B2 | 1/2012 | Diggs et al. | |
| 8,108,605 B2 | 1/2012 | Kurashige | |
| 8,867,153 B1 * | 10/2014 | Coker | G11B 5/012 360/31 |
| 9,483,402 B2 * | 11/2016 | Sterns | G06F 12/0804 |
| 2005/0138296 A1 * | 6/2005 | Coulson | G06F 1/263 711/141 |
| 2011/0010569 A1 * | 1/2011 | Obr | G06F 1/30 713/320 |
| 2012/0311279 A1 | 12/2012 | Hong et al. | |
| 2014/0115238 A1 | 4/2014 | Xi et al. | |
| 2014/0115240 A1 | 4/2014 | Jin et al. | |
| 2014/0189234 A1 | 7/2014 | Tang et al. | |
| 2014/0208004 A1 | 7/2014 | Cohen et al. | |

* cited by examiner

*Primary Examiner* — Matthew Bradley
*Assistant Examiner* — Alan Otto
(74) *Attorney, Agent, or Firm* — Holzer Patel Drennan

(57) ABSTRACT

Implementations disclosed herein provide a method comprising detecting a power supply status, determining a media cache cleaning scheme based on the detected power supply status, and performing the determined cleaning scheme until a predetermined threshold is reached.

20 Claims, 4 Drawing Sheets

MEDIA CACHE CLEANING

BACKGROUND

Shingled magnetic recording allows for increased cell density, but generally entails re-writing an entire band of shingled data when one or more cells within the band are changed. As a back-up during the re-writing, the data is temporarily saved to a second, temporary, memory (e.g., a media cache, etc.).

SUMMARY

In one implementation, this disclosure provides a method comprising detecting a power supply status, determining a media cache cleaning scheme based on the detected power supply status, and performing the determined cleaning scheme until a predetermined threshold is reached.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
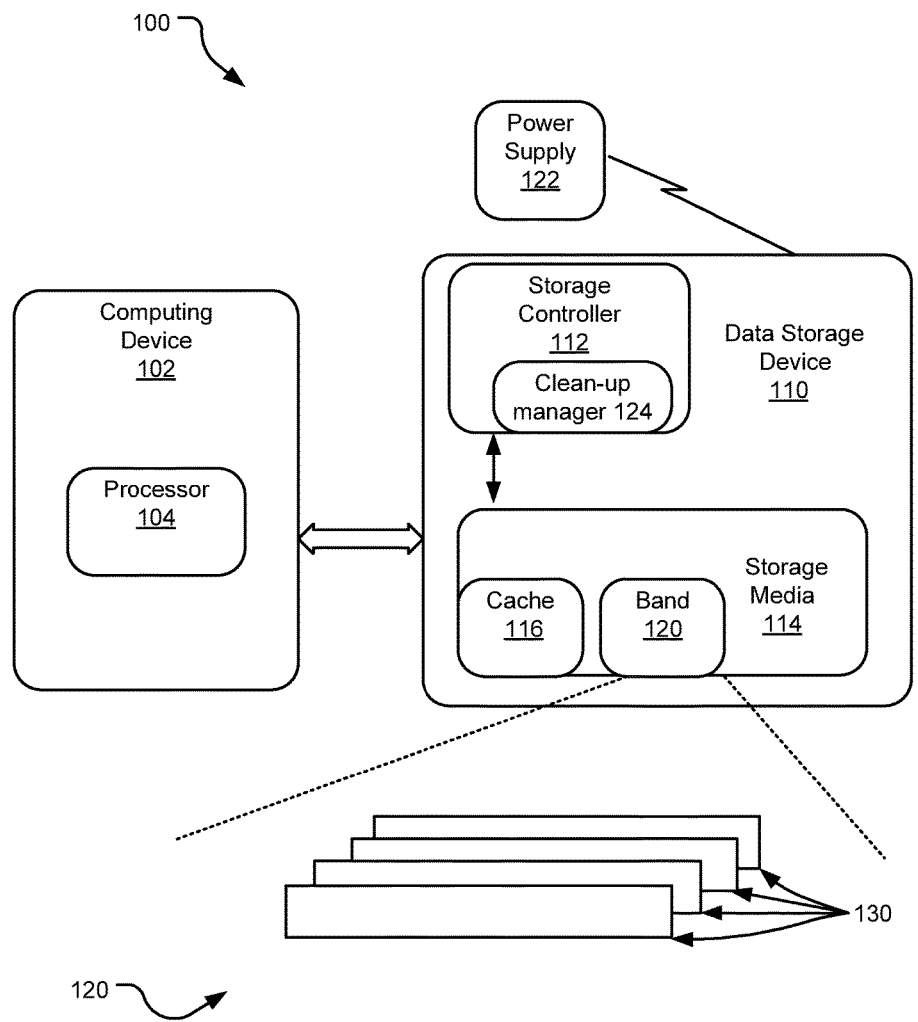
FIG. 1 illustrates a block diagram of an example data storage device system.

In hard disk drive (HDD) designs, disk-resident caching systems store host data to a temporary nonvolatile staging location located in a designated region of a disk area. This cache may be referred to as the disk cache or media cache (MC). MC may be used for a variety of purposes, such as storing data for write commands received from a host or computing device, storing read data in MC for a rewrite operations, etc.

In conventional magnetic media, each of the cells on a magnetized medium (e.g., a magnetic disc) are of a sufficiently large size relative to the size of a corresponding write pole to allow the write pole to write data to the cells without overwriting data in any surrounding cells. As a result, data may be written to available cells anywhere on the magnetic medium. However, as requirements for data storage density increase for magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells).

One technique for adapting the magnetic medium to utilize smaller cells while preventing adjacent data being overwritten during a write operation is shingled magnetic recording (SMR). In SMR, data recording density on a magnetic medium is increased by writing a track of data to partially overlap an adjacent data track, resulting in a "shingled" track structure. SMR utilizes a large strong write field generated by the write pole. One constraint of shingled magnetic recording is that when data is written to the magnetic medium, it is written in sequence on increasing or decreasing radius tracks. The strong write field from the wide writer affects one or more adjacent tracks including the track being written to and one or more previously-written tracks (e.g., tracks located down-track from the track currently being written). As a result, in order to change any particular data cell within the shingled tracks, all of the data within the shingled tracks is re-written in a selected forward sequential write order.

When an SMR device receives a write command to write new data to a magnetic medium or a modify command to modify some existing data on a magnetic medium, the SMR device responds to the write and/or modify command(s) by reading and copying all of the data into a data band. The new material may be written, where such a data band may include a plurality of shingled data tracks located in SMR device's main store. For a SMR device with static logical block address to physical block address mapping, random user data may be written to media cache, and later consolidated and moved to a SMR device's main store during a media cache cleaning process.

The use of MC is often a part of SMR drive architecture. However, managing the MC level can be a challenge. In particular, in a mobile environment (e.g., laptop computers), HDDs have limited time for MC cleaning due to Advanced Power Management ("APM"). APM enables an operating system to achieve power management by turning power off or switching to a different power state (e.g., a sleep mode) when a system is inactive. In a static band mapping scheme, MC cleaning can involve read-modify-write write operations in a 50-track band, and it can take approximately 2 s to complete a full band cleaning process. An idle state can be implemented for adaptive idle time (e.g., 255 ms to 6 s) for accommodating background activities. MC cleaning is triggered when the drive goes to an idle state and MC cleaning stops after this time window. Thus, the MC cleaning rate is very limited with an APM requirement and governed by the duty cycle of a drive. As a result, there may be MC saturation impacting system performance.

MC cleaning cache schemes improve power management in SMR systems. By setting the HDD APM value to a maximum performance setting, MC clean-up and the MC cleaning rate on a SMR drive can greatly improve. With a focus on power-saving remedies when a notebook computer, for example, is running on battery, a notebook HDD may have a default APM value, which may be a maximum power-saving without standby. Because a HDD does not know when the power is connected to a notebook computer, a default APM value may be in place even when the notebook is connected to an external power supply (e.g., AC).

The technology disclosed herein includes a clean-up manager that detects the power source of a mobile environment (e.g., a notebook) and sets an APM value for MC purposes. For example, if a switching application detects a battery power source, and there is no host activity, a switching application can set a specific HDD APM value, the minimum power consumption without standby. A HDD can perform normal MC cleaning until an idle timer expires. In such an example, the MC cleaning rate is dependent on the duty cycle of drive.

In another example, if the switching application (via the HDD receiving information from the host) detects an external power supply (e.g., AC power), and there is no host activity, then a particular HDD APM value of maximum performance is set. The HDD temporarily disables APM and triggers aggressive MC cleaning The cleaning is performed until MC is emptied or a predefined threshold is met.

For example, for a system powered by AC, if MC usage is above a certain threshold (e.g., 20%) or not fully empty, aggressive MC cleaning is triggered by temporarily disabling APM or the idle timer is extended to a longer duration. Once MC is fully cleaned up or its usage drops to below a certain threshold (e.g., 10%), the aggressive cleaning stops by enabling back APM or the idle timer is resumed to a normal setting. After that, the drive resumes normal MC idle cleaning If AC power is removed during aggressive MC cleaning, a cleaning mechanism will be moved to normal MC idle cleaning accordingly, or the MC usage threshold will be used to switch between aggressive and normal MC cleaning By setting the drive's APM value according to situational demands, the disclosed technology provides the performance required to reduce the MC as well as to maintain a power-saving feature when a computer (e.g., notebook) is running on battery. The disclosed MC level and energy management schemes mitigate slow throughput and possible CTO due to saturated MC or a host throttling threshold hit. By setting the HDD's APM value to a maximum performance, the systems and methods disclosed herein improve MC clean-up on a SMR drive and the rate of clean-up, which results in faster system performance and better end-user experience.

FIG. 1 illustrates a block diagram of an example data storage system 100, showing various functional components used to control the operation of a data storage device 110 (e.g., an SMR HDD, an SMR SSHD, an object storage device, etc.). The system 100 includes a computing or host device 102 (e.g., a computer, a mobile device, the internet, etc.) operably connected to the data storage device 110, each of the host device 102 and the data storage device 110 communicating with each other.

A processor 104 is located in the host device 102. The processor 104 sends one or more read or write commands to a storage device controller 112 for execution. As control communication paths are provided between a host device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a non-volatile cache 116 that is either a storage area on the storage media 114 or another non-volatile memory accessible by the data storage device 110. In the depicted system 100, the cache 116 is a storage area on the storage media 114.

A band 120 of shingled tracks may also be located in the storage media 114. In FIG. 1, the shingled tracks 130 located in the band 120 are shown. An implementation of the shingled tracks 130 is arranged such that when data is written to one of the shingled tracks 130 (except for the last data track), a writing operation affects data on an adjacent track in a down-track direction.

A cache clean-up controller or manager 124 is also located in the data storage device 110. The cache clean-up manager 124 detects the status of a power supply from a power supply 122 (e.g., battery, AC) to the data storage device 110. The power supply 122 may be located inside the data storage device 110 or be externally connected to the data storage device 110. After the cache clean-up manager 124 detects the power supply status, the cache clean-up manager 124 communicates with the storage device controller 112 and/or computing device 102 to determine an appropriate cleaning scheme for execution.

Figure 2:
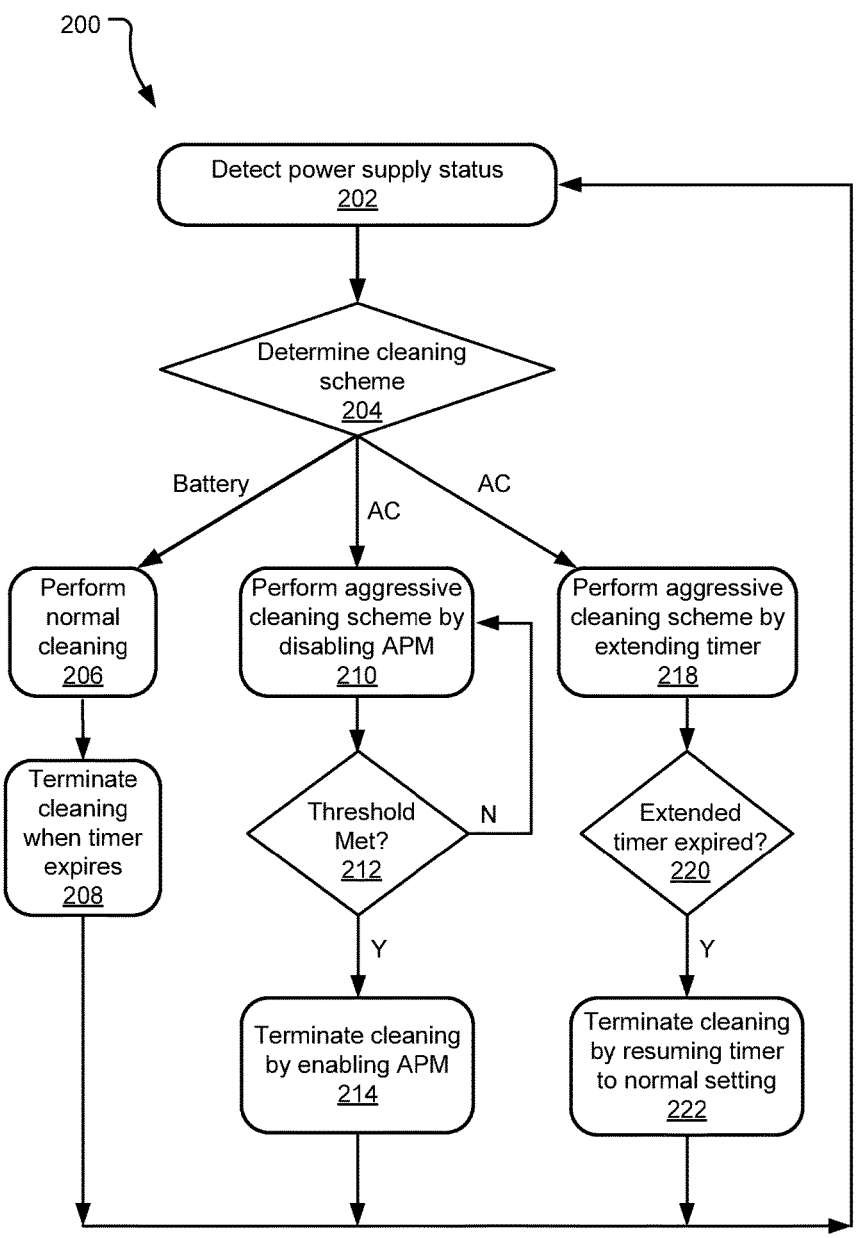
FIG. 2 illustrates example operations for a media cache cleaning scheme.

FIG. 2 illustrates a flowchart of example operations 200 for media cache cleaning schemes. A detecting operation 202 detects a power supply status. After obtaining a power supply status, a determining operation 204 determines an appropriate cleaning scheme. If the HDD is powered by battery, a HDD can perform normal MC cleaning in a performing operation 206. The HDD performs normal cleaning until an idle timer expires in a terminating operation 208. At expiration of the idle timer, the MC cleaning rate is dependent on the duty cycle of drive.

If the HDD receives information from a host controller that there is no host activity and the HDD is powered by AC in the detecting operation 202, then the HDD temporarily disables APM and triggers aggressive MC cleaning A performing operation 210 performs an aggressive cleaning scheme by disabling APM. The cleaning can be performed until a MC is emptied or a predefined threshold is met. A determining operation 212 determines if this threshold is met. For example, for a system powered by AC, if MC usage is above a certain threshold (e.g., 20%) or not fully empty, aggressive MC cleaning is triggered by temporarily disabling APM. Once MC is fully cleaned up or its usage drops to below a certain threshold (e.g., 10%), as identified in the determining operation 212, the aggressive cleaning stops by enabling back APM in a terminating operation 214. Then, detection operation 202 is repeated at a predetermined interval.

If the HDD receives information from the host that there is no host activity and a system is powered by AC in the detecting operation 202, then the HDD can also perform aggressive MC cleaning by extending a timer in a performing operation 218. A determining operation 220 determines if the time has expired. For example, for a system powered by AC, if MC usage is above a certain threshold (e.g., 20%) or not fully empty, aggressive MC cleaning is triggered by extending the idle timer to a longer duration. Once MC is fully cleaned up or its usage drops to below a certain threshold (e.g., 10%), as identified in the determining operation 212, the aggressive cleaning stops by resuming the idle timer to a normal setting in a terminating operation 222. Then, detection operation 202 is repeated at a predetermined interval.

Figure 3:
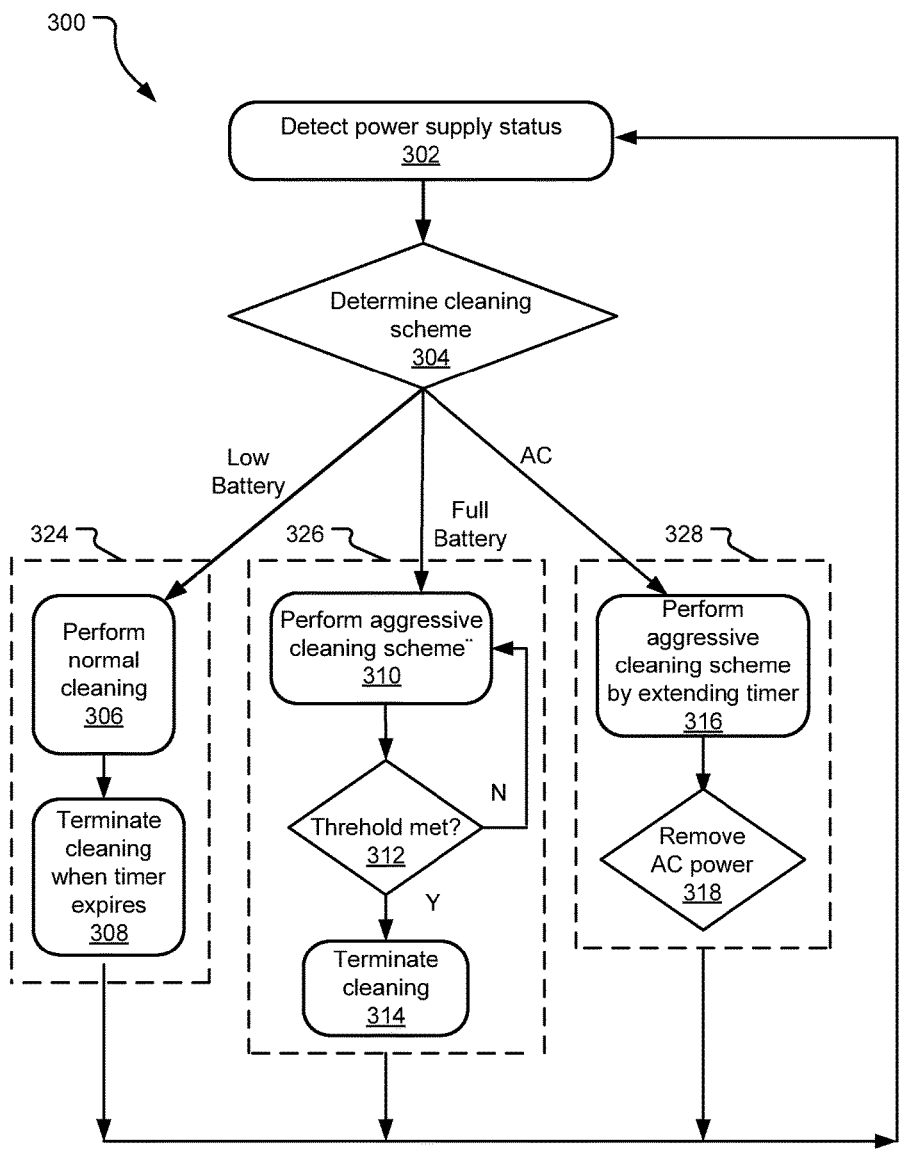
FIG. 3 illustrates example operations for another media cache cleaning scheme.

FIG. 3 illustrates a flowchart of example operations 300 for additional media cache cleaning schemes for three different power states. For a first power state 324, a detecting operation 302 detects a power supply status. Based on the power supply status, a determining operation 304 determines a cleaning scheme. If the power state is a low battery state, a performing operation 306 performs normal cleaning in a normal cleaning operation 306. The normal cleaning operation 306 terminates in a terminating operation 308 when an idle timer expires.

In an example of a second power state 326, a detecting operation 302 detects a power supply status. Based on the power supply status, a determining operation 304 determines a cleaning scheme. If there is no host activity and the power state is determined to be a high or full battery state in the determining operation 402, then the HDD triggers aggressive MC cleaning A performing operation 310 performs an aggressive cleaning scheme. The cleaning can be performed until MC is emptied or a predefined threshold is met. A determining operation 312 determines if this threshold is met. Once MC is fully cleaned up or its usage drops to below a certain threshold as identified in the determining operation 312, the aggressive cleaning stops in a terminating operation 314. Then, detection operation 302 is repeated at a predetermined interval.

In an example of a third power state 328, a detecting operation 302 detects a power supply status. Based on the power supply status, a determining operation 304 determines a cleaning scheme. If there is no host activity and a system is determined to be powered by AC in the determining operation 304, then the HDD can perform aggressive MC cleaning in a performing operation 316. If AC power is lost or removed in a removing operation 318, then detection operation 302 is repeated at a predetermined interval.

Figure 4:
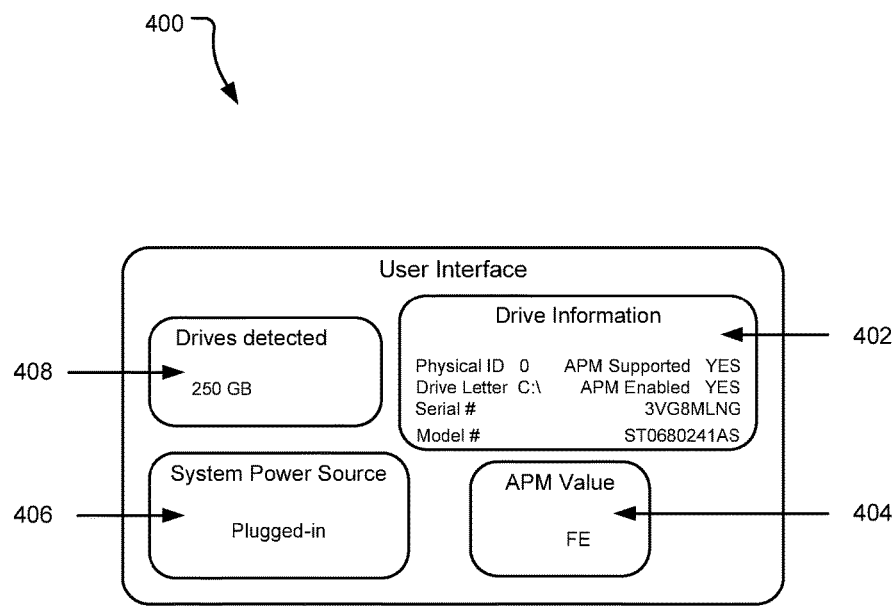
FIG. 4 illustrates an example user interface in a media cache cleaning scheme.

FIG. 4 illustrates an example user interface 400 for a media cache cleaning scheme. As described above, after a power supply status is detected, and a media cache cleaning scheme can be determined based on the detected power supply status, the determined cleaning scheme is performed until a predetermined threshold is reached. A communications interface (e.g., user interface 400) communicates that the predetermined threshold is reached. As shown in FIG. 4, the example user interface 400 represents the primary input/output of the media cache cleaning scheme. In some implementations, different images and terms for parameters and output may appear on the user interface 400 depending on the selected drive 408 used. For example, "Drive Information" 402 on the user interface 400 displays identifying information for the selected drive (e.g., a drive's serial and model number) and whether the APM feature is supported and enabled. An "APM Value" 404 displays a current APM value of the drive. The APM value changes based on the power source of the computer (e.g., notebook). A "System Power Source" 406 displays the current power source of the notebook.

In addition to methods and systems, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
    detecting a battery power supply level with a shingled magnetic recording (SMR) hard disk drive (HDD) cache clean-up manager in the HDD;
    setting an advanced power management (APM) value responsive to the detected battery power supply level;
    determining an SMR HDD media cache (MC) cleaning scheme via communications from the SMR HDD clean-up manager to an SMR HDD controller based on the detected battery power supply level; and
    transferring random user data from a MC to a main storage via the determined SMR HDD MC cleaning scheme until a predetermined threshold of MC usage is reached.

2. The method of claim 1, wherein communicating the predetermined threshold is reached via a communications interface.

3. The method of claim 1, wherein detecting the battery power supply level includes detecting the battery power supply level is low.

4. The method of claim 3, further comprising: initiating a normal SMR HDD MC cleaning scheme based on detecting that the battery power supply level is low.

5. The method of claim 4, wherein the normal SMR HDD MC cleaning scheme terminates upon expiration of an idle timer.

6. The method of claim 1, wherein detecting the battery power supply level is full.

7. The method of claim 6, further comprising:
    initiating an aggressive SMR HDD MC cleaning scheme based on detecting that the battery power supply level is full.

8. The method of claim 7, further comprising:
    holding the APM value without going to an idle status while performing the SMR HDD MC cleaning scheme.

9. The method of claim 8, wherein performing aggressive SMR HDD MC cleaning until the MC is emptied.

10. The method of claim 8, wherein performing aggressive SMR HDD MC cleaning until a certain threshold is reached.

11. The method of claim 8, further comprising releasing the APM value based on termination of aggressive HDD MC cleaning.

12. A system comprising:
a storage media;
a power source detector, configured to:
   determine whether a power supply type is a battery or an external power supply; and
   detect a level of the power supply with a shingled magnetic recording (SMR) HDD cache clean-up manager in the HDD if the power supply is a battery; and
a shingled magnetic recording HDD storage controller, configured to:
   write random user data to a media cache and write sequentially arranged data to a main storage in a hard disk drive (HDD);
   set an advanced power management value responsive to the detected power supply type;
   determine a HDD media cache cleaning scheme based on the detected power supply type; and
   transfer the random user data from the MC to a main storage via the determined HDD media cache cleaning scheme until a predetermined threshold of media cache usage is reached.

13. One or more non-transitory computer-readable storage memory encoding computer-executable instructions for executing on a computer system a computer process that performs a shingled magnetic recording (SMR) hard disk drive (HDD) media cache (MC) cleaning scheme, the computer process comprising:
   writing random user data to a MC and writing sequentially arranged data to a main storage in the SMR HDD;
   detecting a battery power supply level;
   setting an advanced power management (APM) value responsive to the detected battery power supply level;
   determining an SMR HDD MC cleaning scheme based on the detected battery power supply level; and
   transferring the random user data from the MC to a main storage using the determined SMR HDD MC cleaning scheme until a predetermined threshold of media cache usage is reached.

14. The one or more non-transitory computer-readable storage memory of claim 13, wherein the computer process further comprises communicating that the predetermined threshold is reached via a communications interface.

15. The one or more non-transitory computer-readable storage memory of claim 13, wherein the computer process further comprises:
   detecting that the battery power supply level is low.

16. The one or more non-transitory computer-readable storage memory of claim 15, wherein the computer process further comprises:
   initiating a normal HDD MC cleaning scheme based on detecting that the battery power supply level is low.

17. The one or more non-transitory computer-readable storage memory of claim 13, wherein the HDD MC cleaning scheme terminates upon expiration of an idle timer.

18. The one or more non-transitory computer-readable storage memory of claim 13, further comprising:
   holding the APM value without going to an idle status.

19. The one or more non-transitory computer-readable storage memory of claim 13, wherein the computer process further comprises:
   detecting the battery power supply level is full.

20. The one or more non-transitory computer-readable storage memory of claim 19, wherein the computer process further comprises:
   initiating an aggressive HDD MC cleaning scheme based on detecting that the power supply level full.

\* \* \* \* \*